United States Patent
Frotz

(10) Patent No.: US 9,610,874 B2
(45) Date of Patent: Apr. 4, 2017

(54) HEAD RESTRAINT WHICH IS MOVABLE IN THE X DIRECTION

(75) Inventor: Thomas Frotz, Burscheid (DE)

(73) Assignee: JOHNSON CONTROLS GMBH, Burscheid (DE)

(*) Notice: Subject to any disclaimer, the term of this patent is extended or adjusted under 35 U.S.C. 154(b) by 349 days.

(21) Appl. No.: 14/118,861

(22) PCT Filed: May 16, 2012

(86) PCT No.: PCT/EP2012/002113
§ 371 (c)(1),
(2), (4) Date: Jan. 17, 2014

(87) PCT Pub. No.: WO2012/159720
PCT Pub. Date: Nov. 29, 2012

(65) Prior Publication Data
US 2014/0197671 A1    Jul. 17, 2014

(30) Foreign Application Priority Data
May 20, 2011   (DE) .................. 10 2011 102 702

(51) Int. Cl.
*B60N 2/48*   (2006.01)
(52) U.S. Cl.
CPC ......... *B60N 2/4864* (2013.01); *B60N 2/4817* (2013.01)
(58) Field of Classification Search
CPC ............................ B60N 2/4864; B60N 2/4817
See application file for complete search history.

(56) References Cited

U.S. PATENT DOCUMENTS

| 4,191,422 A | * | 3/1980 | Inasawa | B60N 2/4864 297/391 |
| 4,265,482 A | * | 5/1981 | Nishimura | B60N 2/4864 297/391 |
| 4,640,549 A | * | 2/1987 | Yokota | B60N 2/4808 297/356 |
| 4,657,304 A | * | 4/1987 | Heesch | B60N 2/4864 297/391 |

(Continued)

FOREIGN PATENT DOCUMENTS

DE      693 05 514 T2     4/1997
DE   1020040 59 237 B3    2/2006
(Continued)

OTHER PUBLICATIONS

Office Action dated Apr. 27, 2015, in corresponding Chinese application No. 201280024444.8, 8 pages.
(Continued)

*Primary Examiner* — David R Dunn
*Assistant Examiner* — Tania Abraham
(74) *Attorney, Agent, or Firm* — Foley & Lardner LLP

(57) ABSTRACT

A head restraint having a housing which is at least partially movable relative to a supporting rod, by which the head restraint is arranged on the backrest of a vehicle seat, toward and away from the head of the occupant of the seat. A slide is provided on the housing, with a positive connecting and/or non-positive connecting device along the longitudinal extent thereof, which can be brought into engagement with a respective locking device, and as a result can secure the housing in the respective position thereof as desired.

10 Claims, 5 Drawing Sheets

(56) References Cited

U.S. PATENT DOCUMENTS

| | | | | |
|---|---|---|---|---|
| 4,762,367 | A | * | 8/1988 | Denton ............... B60N 2/4864 297/284.8 |
| 4,856,848 | A | * | 8/1989 | O'Sullivan .......... B60N 2/4864 297/391 |
| 5,020,855 | A | * | 6/1991 | Lindberg ............. B60N 2/4808 297/284.1 |
| 6,533,359 | B1 | * | 3/2003 | Holstensson ........ B60N 2/4864 297/391 |
| 6,983,995 | B1 | * | 1/2006 | Veine ....................... A47C 7/38 297/391 |
| 7,631,932 | B2 | * | 12/2009 | Hoffmann ............ B60N 2/4885 297/216.12 |
| 8,038,219 | B2 | * | 10/2011 | Boes ................... B60N 2/4885 297/406 |
| 8,182,042 | B2 | * | 5/2012 | Reel ........................ B60N 2/48 297/391 |
| 2010/0244510 | A1 | * | 9/2010 | Schmitz ............... B60N 2/4885 297/216.12 |
| 2011/0084524 | A1 | * | 4/2011 | Werner ................ B60N 2/4885 297/216.12 |
| 2011/0109131 | A1 | * | 5/2011 | Frose ................... B60N 2/4885 297/216.12 |
| 2011/0109144 | A1 | | 5/2011 | Eckstein et al. |

FOREIGN PATENT DOCUMENTS

| | | |
|---|---|---|
| DE | 1020050 20 276 B3 | 9/2006 |
| DE | 1020060 32 596 A1 | 1/2008 |
| DE | 1020080 57 792 A1 | 5/2010 |
| EP | 1 669 241 A2 | 6/2006 |
| JP | 60-154043 U | 8/1985 |
| WO | WO-2010/115409 A1 | 10/2010 |

OTHER PUBLICATIONS

International Preliminary Report on Patentability and Written Opinion of the International Searching Authority dated Nov. 20, 2013, 11 pages.

International Search Report and Written Opinion mailed Aug. 17, 2012, as received in corresponding International Application No. PCT/EP2012/002113.

Office Action dated Nov. 11, 2014, in corresponding Japanese Application No. 2014-510691 and English translation, 7 pages.

Official Action mailed Jan. 25, 2012, as received in German Patent Application No. 10 2011 102 702.9 and English translation, 8 pages.

* cited by examiner

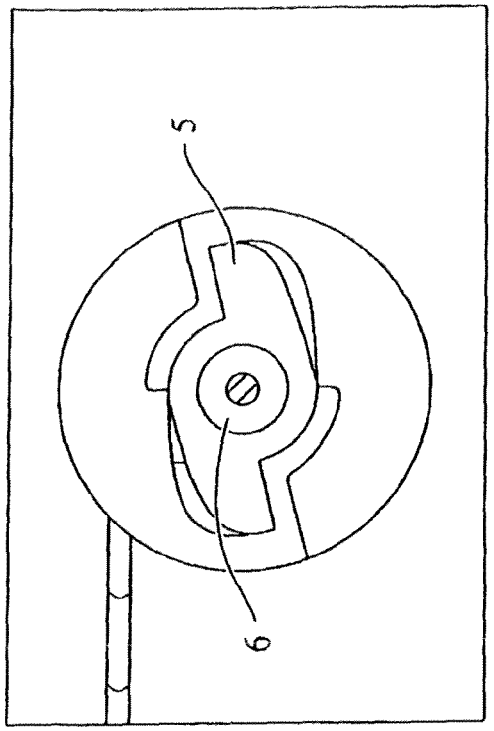
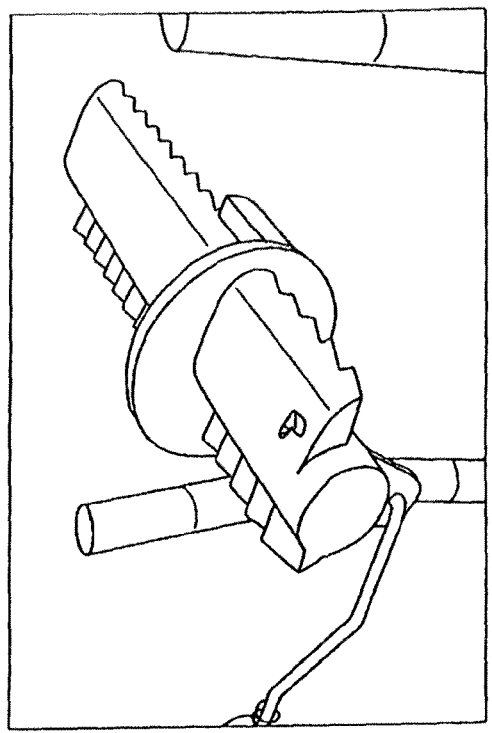
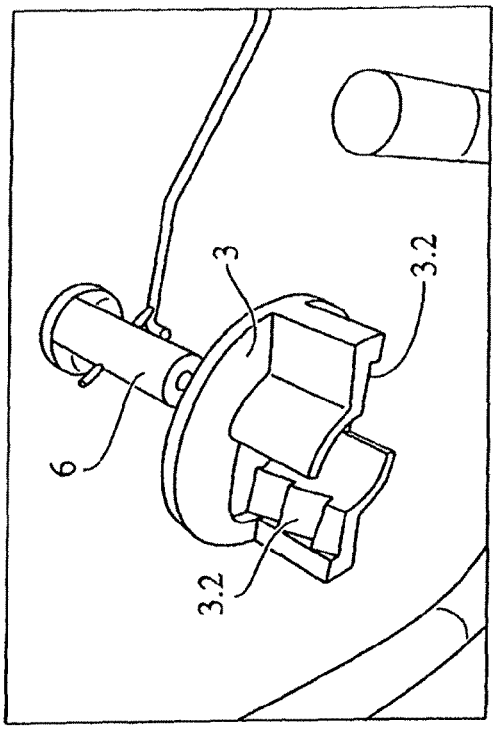
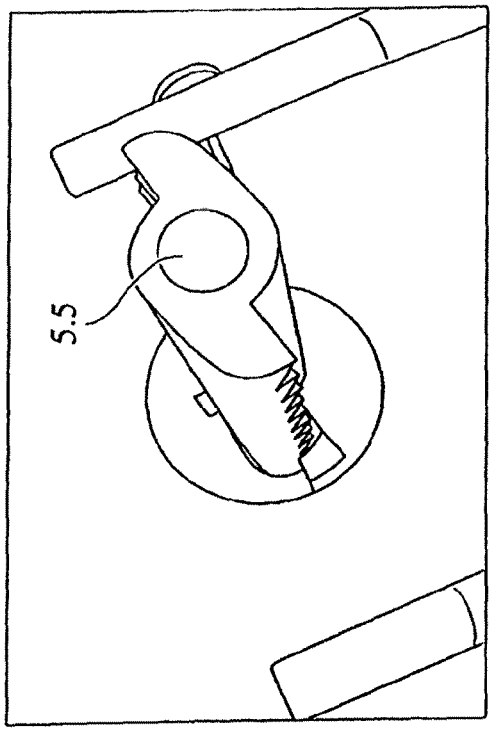

HEAD RESTRAINT WHICH IS MOVABLE IN THE X DIRECTION

CROSS REFERENCE TO RELATED APPLICATIONS

The present application is a U.S. National Stage of International Application No. PCT/EP2012/002113 filed on May 16, 2012, which claims the benefit of German Patent Application No. 10 2011 102 702.9 filed on May 20, 2011, the entire disclosures of all of which are incorporated herein by reference.

The present invention relates to a headrest having a housing which can be moved at least partially relative to a retention rod, by means of which the headrest is arranged on the backrest of a vehicle seat, toward and away from the head of the seat occupant, wherein there is provided on the housing a rotor having along the longitudinal extent thereof positive-locking and/or non-positive-locking means which can selectively be brought into engagement with a locking means and thereby selectively fix the housing in the respective position thereof.

The present invention further relates to a method for adjusting the above-mentioned headrest.

Such headrests are known from the prior art. The adjustment of the housing of the headrest in the X direction serves in particular to increase the comfort of the seat occupant by the headrest being able to be moved toward and away from the head of the seat occupant. In this instance, it is important that the headrest does not move independently away from the head of the seat occupant since, for instance, in the event of a rear-end impact, injuries may thereby be caused to the head, neck and/or back of the seat occupant. For the person skilled in the art, the objective is constantly to improve the present adjustment mechanisms of the headrest.

An object of the present invention was therefore to provide an alternative headrest which can be adjusted in the X direction.

The object is achieved with a headrest having a housing, which can be moved at least partially relative to a retention rod, by means of which the headrest is arranged on the backrest of a vehicle seat, toward and away from the head of the seat occupant, wherein there is provided on the housing a rotor having along the longitudinal extent thereof positive-locking and/or non-positive-locking means which can each selectively be brought into engagement with a locking means and selectively fix the housing in the respective position thereof, wherein there is arranged on the housing a bearing for the rotor and the rotor is provided so as to be able to be rotated and longitudinally displaced relative to this bearing.

The present invention relates to a headrest which is arranged on the backrest of a motor vehicle seat by means of one or two retention rods. This headrest has a housing which can be moved at least partially relative to the retention rod(s) toward and away from the head of the seat occupant, that is to say, in the X direction in accordance with the coordinate system which is determined for the vehicle structure. There is provided on the housing a rotor having positive-locking and/or non-positive-locking means, for example, teeth, which are arranged parallel with the longitudinal axis thereof. These positive-locking and/or non-positive-locking means may selectively be brought into engagement with a locking means, which is preferably securely connected to the retention rod(s) in order to fix the housing in the respective desired position. Preferably, the positive-locking and/or non-positive-locking means are arranged in rows one behind the other, as, for example, in a toothed rod. According to the invention, there is now arranged on the housing a bearing for the rotor, the rotor being provided so as to be able to be rotated and/or longitudinally displaced relative to this bearing and consequently relative to the housing. The positive-locking and/or non-positive-locking means can thereby be selectively brought out of engagement with the locking means.

However, both the rotation and the longitudinal displacement of the rotor are preferably only possible in a limited manner.

According to a preferred or additional subject-matter of the present invention, the rotor is a toothed rod, which has at two opposing sides teeth which are arranged one behind the other in a row, respectively. These rows of teeth may at the same time, in particular by means of a rotation with the locking means, be brought into engagement or released therefrom.

The following explanations apply to both embodiments of the headrest according to the invention to the same extent.

The bearing preferably has one or more control pin(s), which cooperate(s) with a control cam of the rotor. Each control pin is arranged in a fixed manner relative to the bearing of the rotor and/or the housing of the headrest. As a result of a relative axial movement between the rotor and bearing, according to a preferred embodiment the rotor rotates relative to the bearing. In a particularly preferred manner, the control cam is constructed as a control slot, into which the control pin is introduced. Preferably, this control slot has an inclined portion, in a quite particularly preferable manner a helical portion. The control pin can move in this portion relative to the rotor. In this instance, the rotor is preferably rotated. The control cam preferably further has a transverse groove and/or a catch portion.

There is preferably provided between the rotor and the bearing a resilient means which drives the rotor relative to the locking means, in particular in a rotating manner.

An axial play is preferably provided between the rotor and the housing so that the rotor can move relative to the housing.

The present invention further relates to a method for adjusting a headrest having a housing which can be moved at least partially relative to a retention rod, by means of which the headrest is arranged on the backrest of a vehicle seat, toward and away from the head of the seat occupant, wherein there is provided on the housing a rotor having along the longitudinal extent thereof positive-locking and/or non-positive-locking means, which can selectively be brought into engagement with a locking means and selectively fix the housing in the respective position thereof, wherein the housing is first moved forward toward the head of the seat occupant and only then backward away from the head of the seat occupant in order to move the housing away from the head of the seat occupant.

The explanations relating to the headrests according to the invention apply to the method according to the invention in the same manner and vice versa.

When the housing is moved forward, the rotor is preferably temporarily rotated forward in such a manner that it moves out of engagement with the locking means. As soon as this forward movement is interrupted and/or reversed, the positive-locking and/or non-positive-locking means of the rotor and the locking means immediately move into engagement again.

Furthermore, the rotor, when it reaches the foremost position thereof, preferably engages in a locking position relative to the housing. The rotor can then be moved in a backward direction or back and forth, without touching the locking means. As soon as the rotor has reached its rearmost position, the engagement is released again and the positive-locking and/or non-positive-locking means of the rotor again move into engagement with the positive-locking and/or non-positive-locking means of the locking means.

According to an alternative embodiment, the rotor engages when it is moved forward in an unlocking position. It is thereby possible for the headrest to move forward without the rotor being in engagement with the locking means. A disruptive occurrence of noise whilst the rotor is moved forward is thereby prevented. As soon as a backwardly directed force is applied to the housing, this engagement is released and the positive-locking and/or non-positive-locking means of the rotor again move into engagement with the locking means so that a backward movement of the housing of the headrest is blocked. In this embodiment, a backwardly directed movement of the housing of the headrest is only possible when the rotor, for example, by actuating a handle, is moved out of engagement with the locking means.

The inventions are explained below with reference to FIGS. 1 to 16.

These explanations are purely exemplary and do not limit the general notion of the invention. These explanations apply to all aspects of the subject-matter of the present invention to the same extent.

Figure 1:
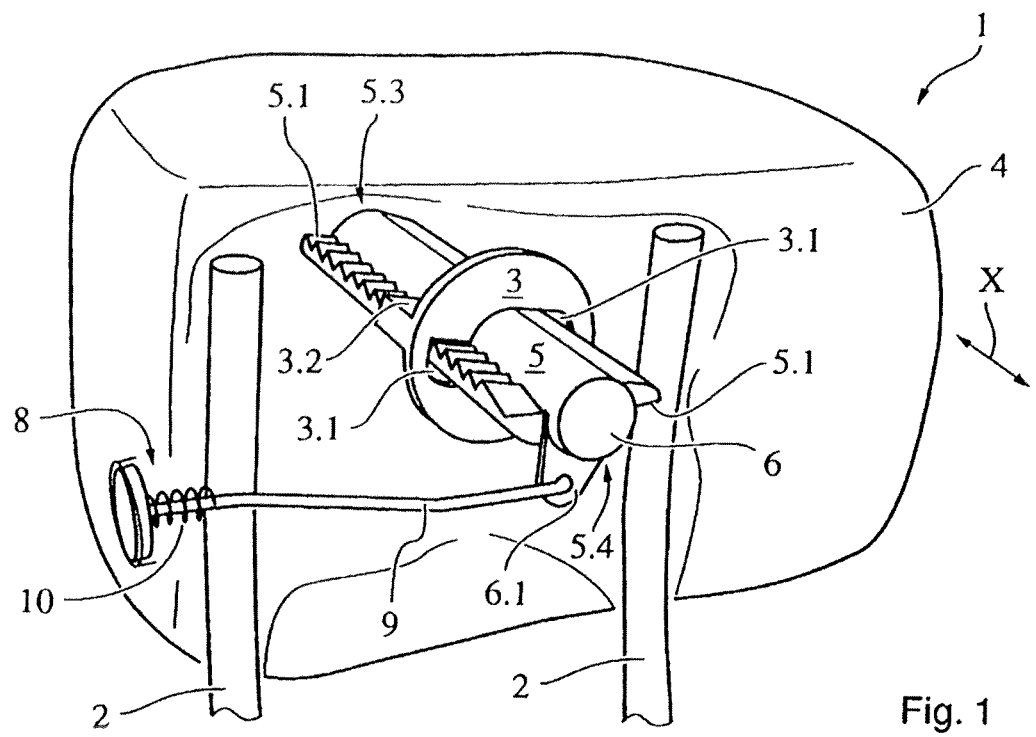
FIG. 1 shows the headrest according to the invention with the rotor locked.
Figure 2:
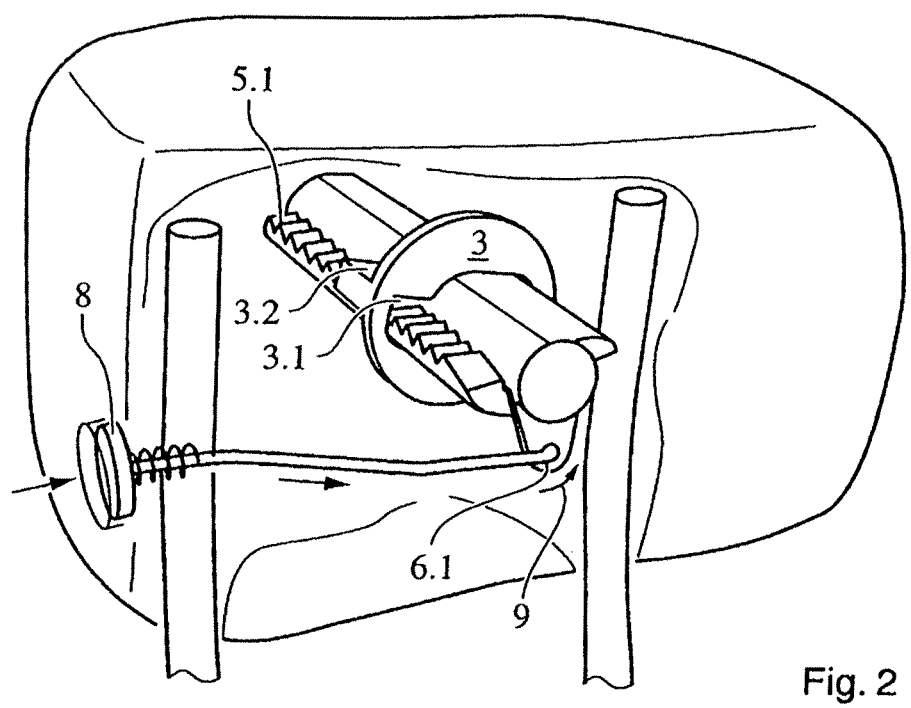
FIG. 2 shows the headrest according to FIG. 1 with the rotor unlocked.
Figure 5:
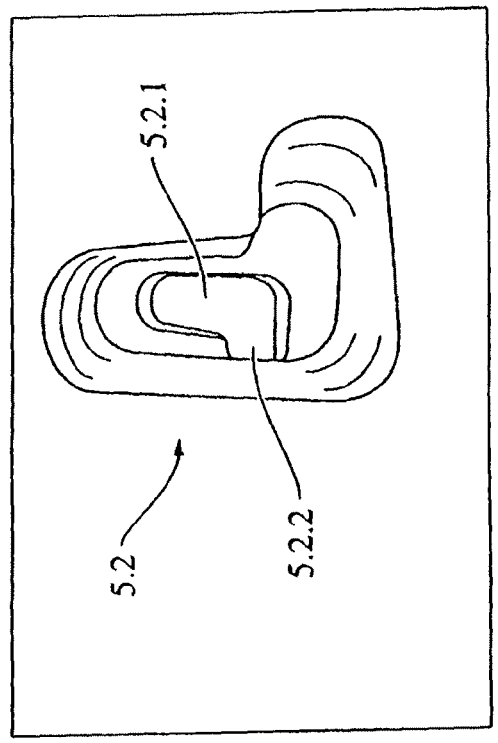
Figure 4:
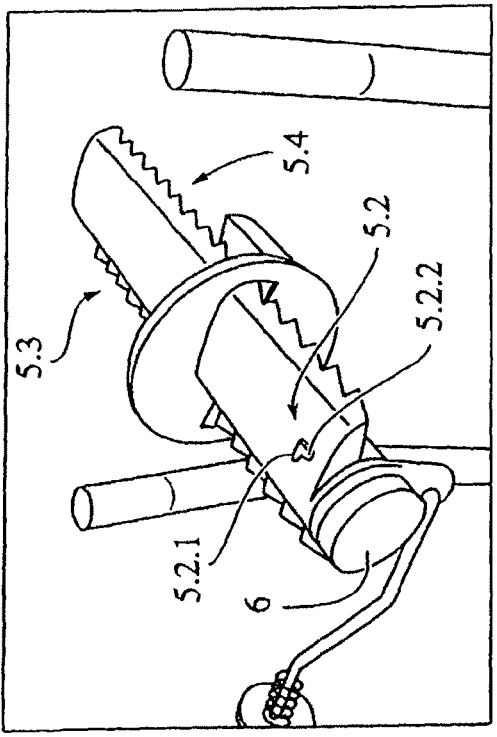
Figure 6:
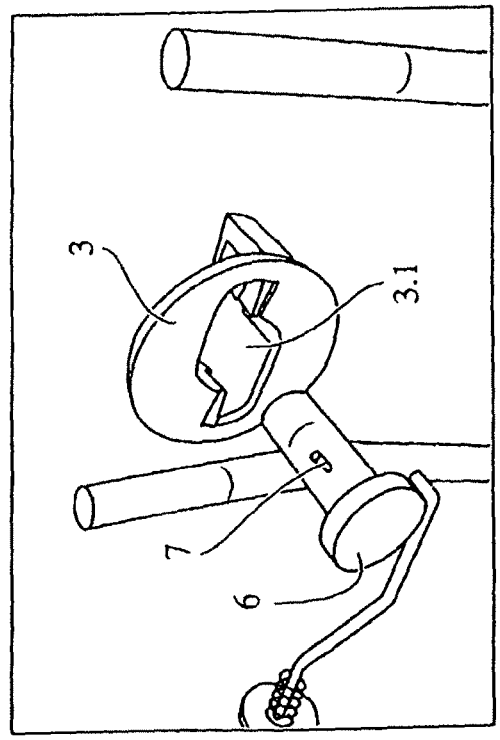
Figure 11:
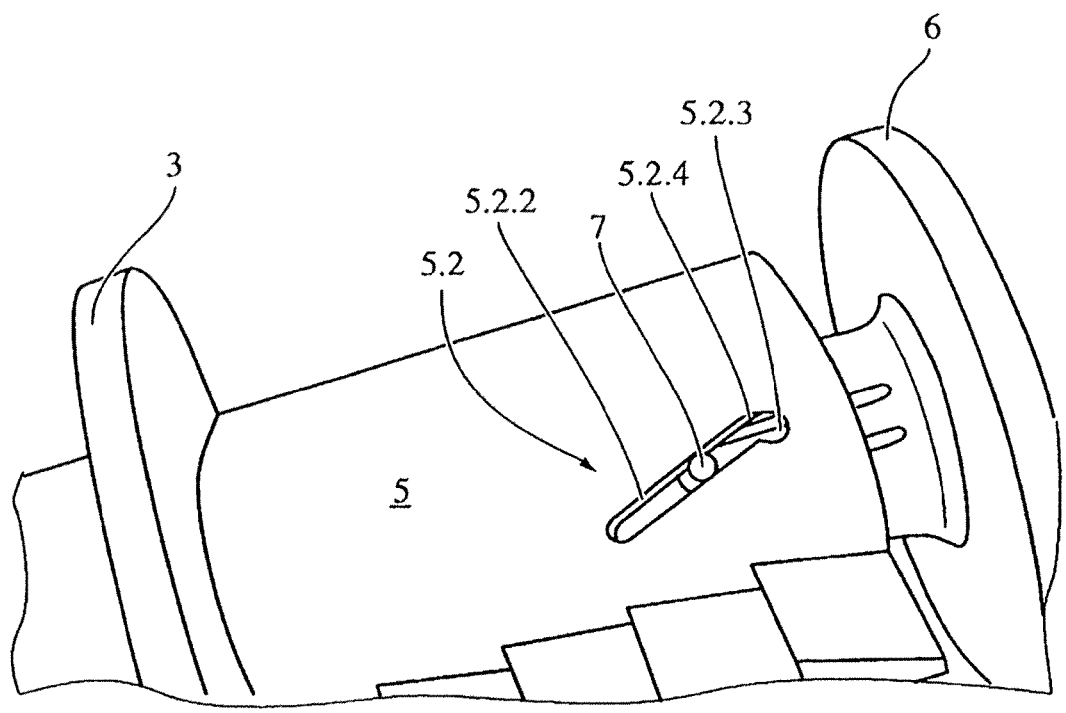
Figure 12:
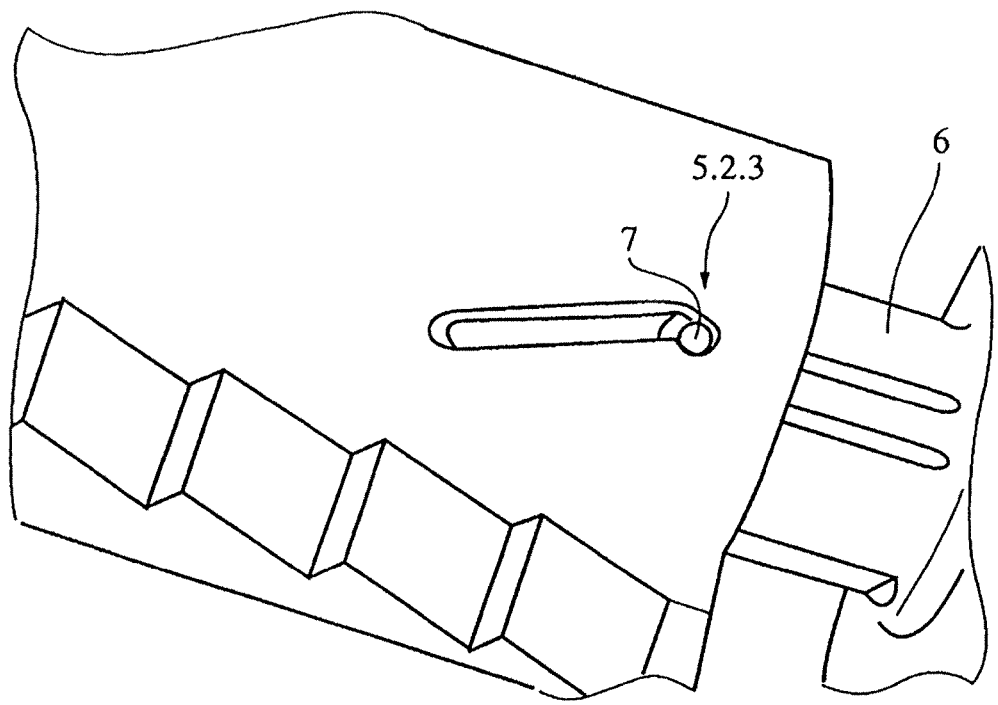
Figure 13:
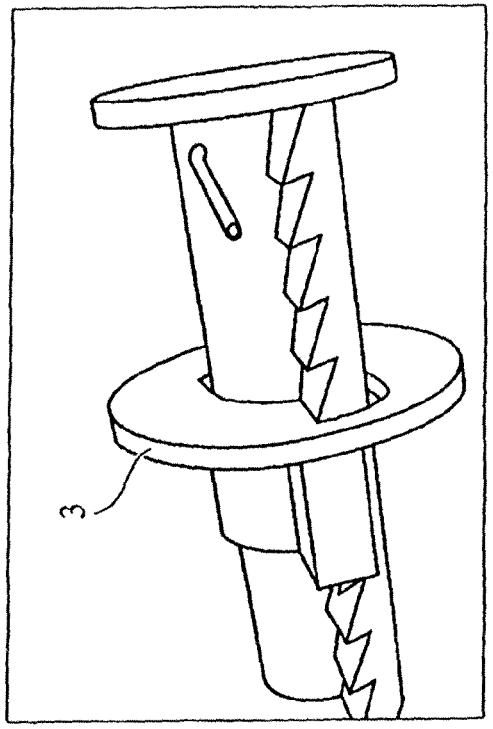
Figure 15:
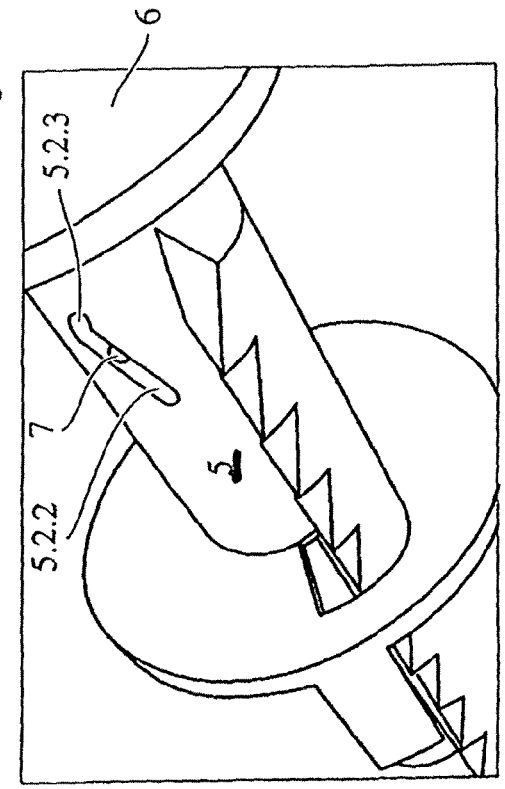
Figure 14:
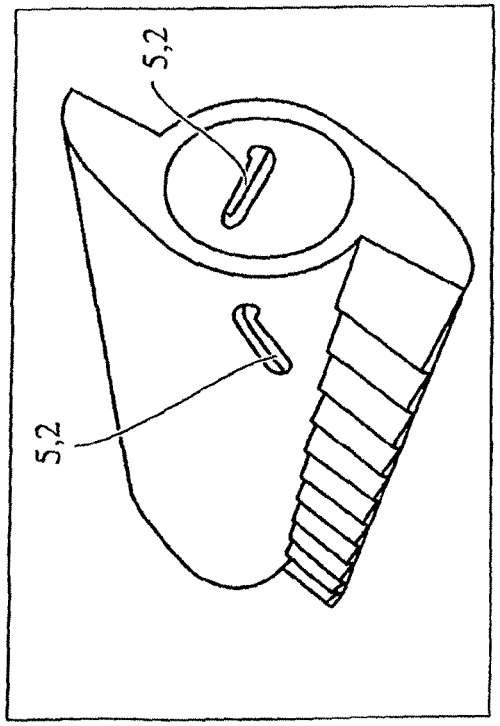
Figure 16:
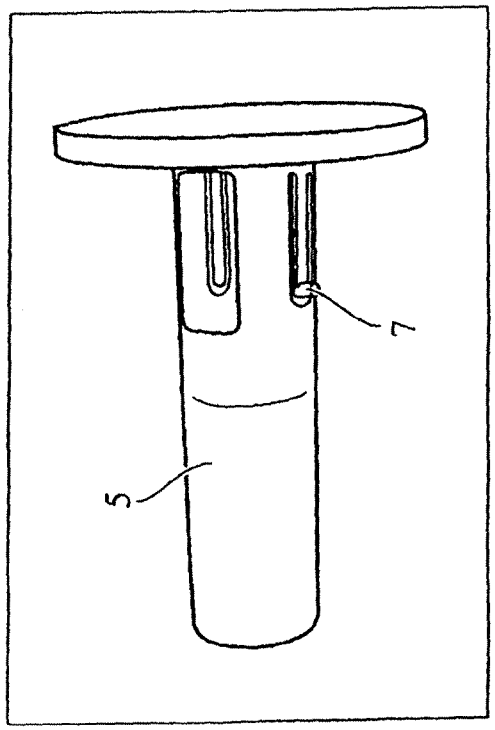

FIG. 4 shows details of the bearing and the locking means according to FIGS. 1 and 2, FIG. 5 shows the rotor and the locking means according to the above Figures, FIG. 6 shows the control cam in the rotor according to the above Figures, FIG. 7 shows further details of the rotor according to the above Figures, FIG. 8 shows further details of the rotor, FIGS. 9 and 10 show the rotor cooperating with the locking means, FIGS. 11 and 12 show another embodiment of the control cam in the rotor, FIGS. 13 to 16 show details of the embodiment of the rotor according to FIGS. 11 and 12.

FIG. 1 shows the headrest 1 according to the invention which is arranged on the backrest (not illustrated) of a vehicle seat by means of two retention rods 2. This headrest has a housing 4 which is preferably provided with upholstery and/or a cover. According to the invention, there is now provision for the housing 4 of the headrest to be able to be moved relative to the retention rods 2 in the X direction toward and away from the head of the seat occupant. To this end, there is provided on the housing 4 by means of a bearing 6 a rotor 5 which is provided so as to be able to be displaced relative to a locking means 3, which is preferably securely connected to the retention rods 2. In order to prevent the housing of the headrest from moving independently, in particular away from the head of the seat occupant, that is to say, into the plane of the paper, the rotor 5 has positive-locking and/or non-positive-locking means 5.1 which are constructed in the present case as teeth and which extend parallel with the longitudinal center axis of the rotor. In the present case, positive-locking and/or non-positive-locking means 5.1 are provided both at the first side 5.3 and at the second side 5.4 of the rotor 5. The rotor 5 is consequently a toothed rod which has rows of teeth 5.1 at two sides. The rotor 5 is provided so as to be able to be rotated by means of a bearing 6 and longitudinally displaced relative to the bearing 6, that is to say, also relative to the housing 4. The rotor 5 extends through a recess 3.1 of the locking means 3 which is at least partially constructed to be larger than the cross-section of the rotor 5. There are provided on the locking means 3 positive-locking and/or non-positive-locking means 3.2 which complement the positive-locking and/or non-positive-locking means 5.1 and which extend parallel with the positive-locking and/or non-positive-locking means 5.1. The positive-locking and/or non-positive-locking means 5.1, 3.2 may selectively be brought into engagement with each other and thereby prevent the rotor from moving independently relative to the locking means at least in one direction. The positive-locking and/or non-positive-locking means 5.1 and 5.3 in the present case are each provided as teeth having an oblique flank and arranged with respect to each other in such a manner that the rotor can be moved in one direction, preferably forward, toward the head of the seat occupant without the positive-locking and/or non-positive-locking means 5.1, 3.2 preventing this movement. Only when the steep flanks of the positive-locking and/or non-positive-locking means 5.1, 3.2 are in engagement with each other is the movement of the rotor relative to the locking means prevented. This is particularly the case in the event of a movement of the rotor that is directed backward, that is to say, directed into the plane of the paper. There is provided on the bearing 6 a control pin 7 which protrudes from the radial periphery of the bearing 6 and which protrudes into a control cam 5.2 which is constructed in the present case as a control slot in the rotor 5. Using the control pin 7 it is possible to selectively transmit torques from the bearing 6 to the rotor 5. A lever 6.1 is provided on the bearing 6. On this lever there is supported one end of a rod assembly 9 which has at the other end thereof a handle 8, in this instance in the form of a push-button, by means of which the locking between the rotor 5 and the locking means 3 can be released. There is provided between the handle 8 and the housing 4 a resilient means 10 which pretensions the rotor 5 into the locking position thereof.

The unlocking of the rotor 5 is indicated in FIG. 2. By pressing the handle 8, as indicated by the arrow, a rotation movement of the bearing 6 is produced, which is indicated by the arrow 9. The rotation movement is transmitted to the rotor 5 so that the positive-locking and/or non-positive-locking means 5.1 of the rotor 5 move out of engagement with the positive-locking and/or non-positive-locking means 3.2 of the locking means 3. In this position, the rotor 5 can be moved both toward the head of the seat occupant and away from the head of the seat occupant, without the positive-locking and/or non-positive-locking means 5.1, 3.2 touching each other. As soon as the handle 8 is released again, the rotor 5 rotates back and the positive-locking and/or non-positive-locking means 5.1, 3.2 move into engagement with each other again.

Figure 3:
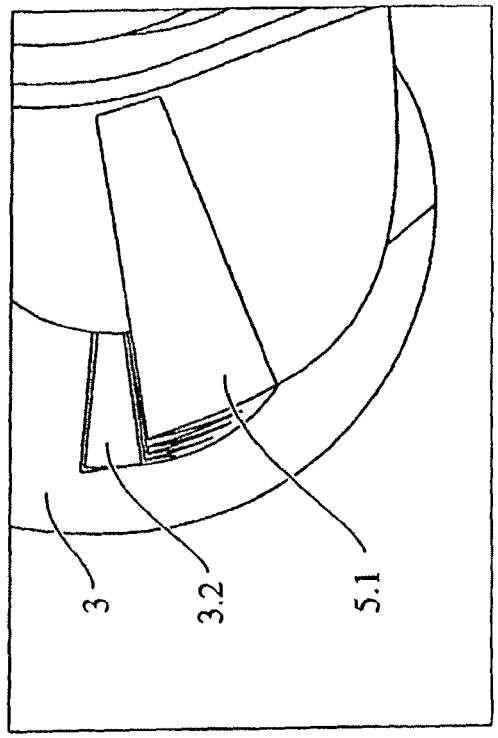
FIG. 3 shows details of the rotor according to FIGS. 1 and 2.

If the headrest is now only pulled forward without the handle 8 having been actuated, the inclined teeth backs of the positive-locking and/or non-positive-locking means 5.1, 3.2 slide along each other and thereby rotate the rotor in an anti-clockwise direction, which can be seen in particular in FIGS. 3 and 5. Shortly before the tooth tips of the teeth 3.2 of the locking means and the tooth tips of the teeth 5.1 of the rotor 5 are in the same axial position, the control pin 7 slides from a transverse groove 5.2.1 (cf. FIGS. 3 and 6) of the control slot 5.2 into the steep portion of the control cam 5.2, which portion is arranged substantially parallel with the longitudinal axis of the rotor and rotates the teeth 5.1 completely out of the tooth arrangement 3.2 of the locking means 3 in this instance. The pitch of the portion 5.2.2 acts in this instance counter to the force of the spring 10. As soon as the control pin 7 has reached the base of the portion 5.2.2, it carries the rotor 5 as far as any end of the travel path. When the control pin 7 is moved from the transverse groove 5.2.1 as far as the base of the portion 5.2.2, the bearing 6 has moved relative to the rotor 5. Each backward displacement of the housing of the headrest 1 and consequently the bearing 6, without the handle being actuated, leads to the immediate locking of the rotor relative to the locking means 3 by the locking pin 7 moving again from the base of the portion 5.2.2 into the transverse groove 5.2.1. In this instance, a relative movement also takes place between the rotor 5 and the bearing 6.

FIGS. 7 to 10 show further details of the headrest according to FIGS. 1 to 6. In FIG. 7, it can clearly be seen that the positive-locking and/or non-positive-locking means 3.2 of the locking means 3 are also arranged in rows parallel with the longitudinal axis of the rotor 5 and these positive-locking and/or non-positive-locking means 3.2 have an inclined tooth back. In FIG. 8, it is possible to see in the rotor 5 a recess 5 in which the bearing 6 engages. The rotor 5 can rotate and both rotate and be longitudinally displaced relative to the bearing 6, the longitudinal displacement and the rotation being limited by the cooperation of the control pin 7 with the control slot.

FIGS. 11 to 16 show another embodiment of the headrest according to the invention, reference substantially being able to be made to the statements which have been made in relation to the headrest according to FIGS. 1 to 10. In the present case, the headrest preferably does not have any manual unlocking system and the control cam 5.2, as can be seen in particular in FIGS. 11 and 12, has a steep, preferably helical portion 5.2.2 and a catch portion 5.2.3. If the housing 4 of the headrest 1 is moved backward from any starting position, that is to say, away from the head of the seat occupant, which may occur, for example, in the event of a rear-end impact, the control pin 7 which is provided on the housing in a fixed manner rotates the positive-locking and/or non-positive-locking means 5.1 of the rotor 5 in the positive-locking and/or non-positive-locking means 3.2 of the locking means 3 and thereby block a backward movement of the housing 4 of the headrest 1. If the position of the headrest is intended to be adapted in a backward direction, for example for reasons of comfort, the housing 4 of the headrest 1 is pulled forward for unlocking, that is to say, toward the head of the seat occupant as far as the end stop thereof. In this instance, the positive-locking and/or non-positive-locking means 5.1, 3.2 which are constructed in this instance as teeth with an oblique and a steep flank slide along each other. During this movement, the control pin 7 of the bearing 6 slides forward in the control cam as far as a location shortly before the turning point 5.2.4. This axial movement of the bearing 6 and consequently the control pin 7 leads to a rotation movement of the rotor 5 so that the positive-locking and/or non-positive-locking means 5.1 of the rotor 5 rotate out of the positive-locking and/or non-positive-locking means 3.2 of the locking means 3 and consequently completely separate the tooth arrangement. After the control pin 7 has reached the turning point, the housing 6 and the rotor 7 move together. By means of any backward displacement of the housing 4 and consequently the bearing 6, the rotor 5 is rotated again into the locking position thereof by means of the cooperation of the control pin 7 with the control cam 5.2. However, if the forward movement is continued as far as a front end stop, the control pin moves beyond the turning point 5.2.4 into the catch portion 5.2.3 so that the rotor 5 is fixed in the unlocked state thereof. In this state, the housing 4 of the headrest 1 can be moved backward as far as a rear stop. As soon as this rear stop is reached, during a further backward movement of the housing 4 and consequently of the bearing 6, the control pin 7 is again pressed out of the catch portion 2.2.3 and beyond the turning point 5.2.4 as far as the base of the portion 5.2.2. In this instance, the rotor 5 rotates so that the positive-locking and/or non-positive-locking means 5.1 are again brought into engagement with the positive-locking and/or non-positive-locking means 3.2 of the locking means. The housing can now again be pulled only forward by the oblique flanks of the positive-locking and/or non-positive-locking means 5.1, 3.2 sliding one along the other. A backward movement is locked by the locking means 3.

FIG. 12 shows the control pin 7 in the engaging portion 3.2.3. From FIGS. 13 and 14, it can be seen that the rotor 5 has two opposing control cams 5.2 in which a control pin 7 engages, respectively. FIGS. 15 and 16 again show details of the rotor or the locking means 3. Furthermore, reference is made to the explanations according to FIGS. 1 to 10.

LIST OF REFERENCE NUMERALS

1 Headrest
2 Retention rod
3 Locking means
3.1 Recess
3.2 Positive-locking and/or non-positive-locking means, teeth
4 Housing
5 Rotor, toothed rod
5.1 Positive-locking and/or non-positive-locking means, teeth
5.2 Control cam, control slot
5.2.1 Transverse groove
5.2.2 Steep portion of the control cam, helical portion
5.2.3 Catch portion
5.2.4 Turning point
5.3 First side
5.4 Second side
5.5 Recess
6 Bearing
6.1 Lever
7 Control pin
8 Handle
9 Arrow, rotation direction
10 Resilient means

The invention claimed is:
1. A headrest comprising:
a housing which can be moved at least partially relative to a retention rod toward and away from the head of the seat occupant,
wherein the headrest is configured to be arranged on a backrest of a vehicle seat through the housing;
a rotor provided on the housing and having a positive-locking or non-positive locking mechanism,
wherein the positive-locking or non-positive locking mechanism extends along an axis parallel to a longitudinal axis, wherein the rotor and the positive-locking or non-positive locking mechanism are configured to move congruently and rotate congruently about an axis parallel to the longitudinal axis, wherein the longitudinal axis extends in a direction toward and away from the head of the seat occupant, wherein the positive-locking or non-positive-locking mechanism can selectively be brought into engagement with a locking mechanism connected to the retention rod and is configured to fix the housing in a particular position relative to the retention rod; and a bearing for the rotor, wherein the bearing is arranged on the housing and the rotor is provided so as to be able to be rotated and longitudinally displaced relative to the bearing.

2. The headrest as claimed in claim 1, wherein the positive-locking or non-positive locking mechanism is teeth and the rotor is a rod, wherein the teeth are on two opposing sides of the rod.

3. The headrest as claimed in claim 1, wherein the bearing has a control pin which cooperates with a control cam of the rotor, wherein the control pin protrudes from a radial periphery of the bearing and is configured to protrude into the control cam.

4. The headrest as claimed in claim 3, wherein the control cam is a control slot.

5. The headrest as claimed in claim 1, wherein a resilient mechanism is provided for pretensioning the rotor and the bearing into a locking position with the locking mechanism.

6. The headrest as claimed in claim 1, wherein the rotor is supported on the housing with axial play.

7. A method for adjusting a headrest having a housing which can be moved at least partially relative to a retention rod toward and away from the head of the seat occupant, wherein the headrest is configured to be arranged on a backrest of a vehicle seat through the housing, a rotor provided on the housing and having a positive-locking or non-positive-locking mechanism, wherein the positive-locking or non-positive locking mechanism extends along an axis parallel to a longitudinal axis, wherein the rotor and the positive-locking or non-positive locking mechanism are configured to move congruently and rotate congruently about an axis parallel to the longitudinal axis, wherein the longitudinal axis extends in a direction toward and away from the head of the seat occupant, and a bearing for the rotor that is provided on the housing, the method comprising:

selectively bringing the positive-locking or non-positive-locking mechanism into engagement with a locking mechanism connected to the retention rod and fixing the housing in a particular position relative to the retention rod;

moving the housing forward toward the head of the seat occupant and then backward away from the head of the seat occupant in order to move the housing away from the head of the seat occupant; and rotating and longitudinally displacing the rotor relative to the bearing.

8. The method as claimed in claim 7, wherein the rotor is rotated forward during the movement.

9. The method as claimed in claim 7, wherein the rotor engages in an unlocking position when it has reached its foremost position.

10. The method as claimed in claim 7, wherein the rotor engages in an unlocking position during the forward movement.

* * * * *